(12) United States Patent
Mayor et al.

(10) Patent No.: US 8,046,110 B2
(45) Date of Patent: Oct. 25, 2011

(54) CONTROL OF ACTIVE POWER RESERVE IN A WIND-FARM

(75) Inventors: Jesus Mayor, Pamplona (ES); David Sole, Pamplona (ES); Jorge Acedo, Pamplona (ES); Ainhoa Carcar, Pamplona (ES); Javier Perez Barbachano, Pamplona (ES); Mikel Zabaleta, Pamplona (ES); Susana Simon, Pamplona (ES)

(73) Assignee: Ingeteam Energy, S.A., Navarra (ES)

( * ) Notice: Subject to any disclaimer, the term of this patent is extended or adjusted under 35 U.S.C. 154(b) by 0 days.

(21) Appl. No.: 12/945,393

(22) Filed: Nov. 12, 2010

(65) Prior Publication Data
US 2011/0118884 A1   May 19, 2011

Related U.S. Application Data

(62) Division of application No. 11/842,585, filed on Aug. 21, 2007.

(51) Int. Cl.
| G05D 3/12 | (2006.01) |
| G05D 5/00 | (2006.01) |
| G05D 9/00 | (2006.01) |
| F03D 9/00 | (2006.01) |
| H01M 10/46 | (2006.01) |
| H02J 3/00 | (2006.01) |

(52) U.S. Cl. ............ 700/297; 700/9; 700/33; 700/286; 700/287; 290/44; 320/101; 307/53; 307/59

(58) Field of Classification Search ............... 700/9, 10, 700/22, 33, 286, 287, 289, 290, 291, 295, 700/296, 297; 290/44; 320/101; 307/53–59
See application file for complete search history.

(56) References Cited

U.S. PATENT DOCUMENTS

| 5,642,007 | A | 6/1997 | Gyugyi et al. |
| 6,724,097 | B1 | 4/2004 | Wobben |
| 6,784,564 | B1 | 8/2004 | Wobben |
| 6,891,281 | B2 | 5/2005 | Wobben |
| 6,906,431 | B2 | 6/2005 | Wobben |
| 7,199,482 | B2 * | 4/2007 | Hopewell ................ 290/44 |
| 7,372,173 | B2 | 5/2008 | Lutze et al. |
| 7,514,907 | B2 | 4/2009 | Rajda et al. |
| 7,804,183 | B2 * | 9/2010 | Arinaga ................ 290/44 |
| 2003/0102675 | A1 | 6/2003 | Noethlichs |
| 2004/0207207 | A1 | 10/2004 | Stahlkopf |

(Continued)

FOREIGN PATENT DOCUMENTS

EP   1 850 002 A1   10/2007

(Continued)

OTHER PUBLICATIONS

Zbigniew Lubosny et al: "Supervisory Control of a Wind Farm" IEEE Transactions on Power Systems, IEEE Service Center, Piscataway, NJ, US, vol. 22, No. 3, Aug. 1, 2007, pp. 985-994, XP011189262.

(Continued)

Primary Examiner — Sean Shechtman
(74) Attorney, Agent, or Firm — Sughrue Mion, PLLC (57) ABSTRACT

A method and system of active power reserve regulation in a wind farm with a communication network having a plurality of wind turbines that provide an active power reserve in order to support eventual power grid contingencies and to deliver an increase of power in case it is needed.

13 Claims, 7 Drawing Sheets

U.S. PATENT DOCUMENTS

| | | |
|---|---|---|
| 2005/0121214 A1 | 6/2005 | Gould |
| 2006/0273595 A1 | 12/2006 | Avagliano et al. |
| 2007/0018457 A1 | 1/2007 | Llorente Gonzalez |
| 2007/0047163 A1 | 3/2007 | Lutze et al. |
| 2007/0063519 A1 | 3/2007 | Wobben |
| 2007/0078567 A1 | 4/2007 | Riesberg et al. |
| 2007/0085343 A1 | 4/2007 | Fortmann |
| 2008/0048501 A1 | 2/2008 | Jurkat et al. |
| 2010/0280672 A1 | 11/2010 | Llorente Gonzalez et al. |

FOREIGN PATENT DOCUMENTS

| | | |
|---|---|---|
| JP | 2000-69797 A | 3/2000 |
| JP | 2002-155850 A | 5/2002 |
| WO | 2005/031160 A2 | 4/2005 |
| WO | 2005/067119 A1 | 7/2005 |
| WO | 2005/085634 A1 | 9/2005 |
| WO | 2006/088078 A1 | 8/2006 |
| WO | 2006/120033 A2 | 11/2006 |
| WO | 2007/006565 A2 | 1/2007 |

OTHER PUBLICATIONS

Hansen et al: "Centralised power control of wind farm with doubly fed induction generators" Renewable Energy, Pergamon Press, Oxford, GB, vol. 31, No. 7, Jun. 1, 2006, pp. 935-951, XP005257065.

Vincent Courtecuisse et al: "Performace comparison of different wind generator based hybrid systems" Power Electronics and Motion Control Conference, 2008. EPE-PEMC 2008. 13th, IEEE, Piscataway, NJ, USA, Sep. 1, 2008, pp. 2184-2191, XP031329147.

International Search Report and Written Opinion, dated Jan. 14, 2009, for PCT/IB2007/004603.

\* cited by examiner

CONTROL OF ACTIVE POWER RESERVE IN A WIND-FARM

CROSS-REFERENCE TO RELATED APPLICATIONS

This is a divisional of U.S. application Ser. No. 11/842,585, filed Aug. 21, 2007. The entire disclosure of the prior application is incorporated by reference herein.

FIELD OF THE INVENTION

Apparatuses, methods and articles of manufacture consistent with the present invention relate to the field of wind power generation, and, more particularly, advanced wind-farm power management.

BACKGROUND OF THE INVENTION

In an electric power grid ("grid") it is necessary to continuously match the power consumption and generation in order to keep the frequency and voltage within the grid within allowed limits. The electric utility continuously monitors both magnitudes and must be able to issue commands to generation units in order to stabilize the electric power grid. This requires power generation units to be able to deliver an increase of power if the Electric Utility demands it, and thus, the generation units must be able to maintain and manage a reserve of active power (also known as real power). More specifically, taking S as the complex power, P as the real or active power and Q as the reactive power, the relationship S=P+iQ is generally satisfied.

DESCRIPTION OF THE PRIOR ART

In the last few years, wind power generation has increased considerably worldwide. This growth is widely forecast to continue into the next decades, even as the industry and technology have arisen to a mature level in this field. As wind farms grow in size and the total base of installed wind capacity continues to increase, the importance of improving both the power output quality and the grid stability becomes a challenge of great importance to wind developers and utility customers alike. As more wind energy is injected into the grid, it is highly convenient that wind-farms behave as similar as possible to other sources of conventional power generation, taking into account the particular nature of wind.

From the point of view of the electric utility, it is important to accurately control the grid voltage and frequency. For these purposes, conventional power plants are required to supply extra active and reactive power when needed by the Electric Utility. These demands are not currently being fulfilled appropriately by wind-farms and act as constraints in the spreading of wind power plants. Until now, a wind power plant could not be considered as a conventional power plant because it has not been possible to accurately determine an active power reserve due to the uncertainty of the wind conditions. Conventional methods have not succeeded in either achieving an accurate estimation of the active power reserve or an accurate response to the power demand. There is a need to develop an accurate method to generate an active power reserve as the utility may demand it and in some cases has even offered to give a bonus to the project developers of such a method.

U.S. application Ser. No. 11/615,241, the disclosure of which is incorporated herein by reference, describes a method to control reactive power in a wind-farm in order to fulfill the reactive power requirement. The '241 application also describes a method to control a reserve of reactive power which is available in case the electric utility demands it.

Conventional methods are known to limit the active power output from a wind-farm, for example, to adapt production to the constraints of the evacuation capacity, i.e. the maximum power that can be delivered to the grid However, these methods do not guarantee a reserve of active power.

Consequently, there is a need for a strategy to guarantee a reserve of active power. Such a reserve would allow wind-farms to resemble conventional power generation sources and thereby make it more convenient for the electric utility to stabilize the frequency and voltage of the grid.

SUMMARY OF THE INVENTION

It is an aspect of exemplary embodiments of the present invention to provide a control of active power reserve in an integrated manner taking into account the network priorities at each moment as well as the effort demanded by the wind turbines. This method in conjunction with the control of reactive power reserve described in U.S. application Ser. No. 11/615,241 allows the complete control of the wind-farm so as to appear as a conventional power plant.

It is an aspect of certain embodiments of the present invention to provide wind-farm control with a better regulation ability, such as being able to increase or decrease the active power supplied to the grid in order to maintain the frequency stability of the grid which operates as an automatic global adjustment of power to control the frequency of the grid.

Thereby, the active power system described here is even able to manage an active power reserve in order to cope with eventual grid contingencies. In this way, control of the active power reserve is granted a key role in a wind farm power production strategy.

According to one aspect of an exemplary embodiment of the present invention the wind-farm controller defines two operational modes for each wind-turbine:
 an active power observer mode (APOM); and
 an active power reserving mode (APRM).

When a wind-turbine is operated in APOM the power output is controlled in accord with the maximum power available with the actual wind conditions or, at least, without regard to maintaining an active power reserve. In this mode the wind-farm controller does not impose any constraint in the active power generated by the wind-turbine.

Alternatively, when a wind-turbine is operated in APRM the wind-farm controller issues a command that limits the maximum active power output from the wind-turbine. Therefore, the wind farm's total active power production will be maintained below the maximum power available based on actual wind conditions. Accordingly, there is additional power potential available in the wind farm based on the actual wind conditions. Thus, the actual power output is lower than the maximum power output attainable based on the estimation obtained from the wind turbines operate in APOM.

An aspect of an embodiment of the present invention is the optional use of at least one controlled load (CL) in order to take advantage of the active power reserve in the wind farm. Such a controlled load could be used as an electric load or as an energy storage unit such as a hydrogen generator, a flywheel, etc. The controlled load is subordinated to the grid active reserve requirements. In case the grid needs extra power, the controlled load power consumption could be ramped down or even switched off.

In at least one embodiment, the wind farm central control (WFCC) employs the wind-turbines operating in APOM to measure the power available in the wind-farm. In contrast, wind-turbines operating in APRM are commanded to achieve the desired active power reserve for the wind-farm.

BRIEF DESCRIPTION OF THE DRAWINGS

The incorporated drawings depict certain embodiments of the invention. However, they should not be taken to limit the invention to the specific depicted embodiment. Aspects of the present invention will become more apparent by describing in detail illustrative, non-limiting embodiments thereof with reference to the accompanying drawings, in which.

DETAILED DESCRIPTION

Aspects and features of the present invention and methods of accomplishing the same may be understood more readily by reference to the following detailed description of the exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Several drawings will be referenced only as illustration for the better understanding of the description. Furthermore, the same reference numbers will be used in the drawings and in the description to refer to the same or like elements.

Figure 1:
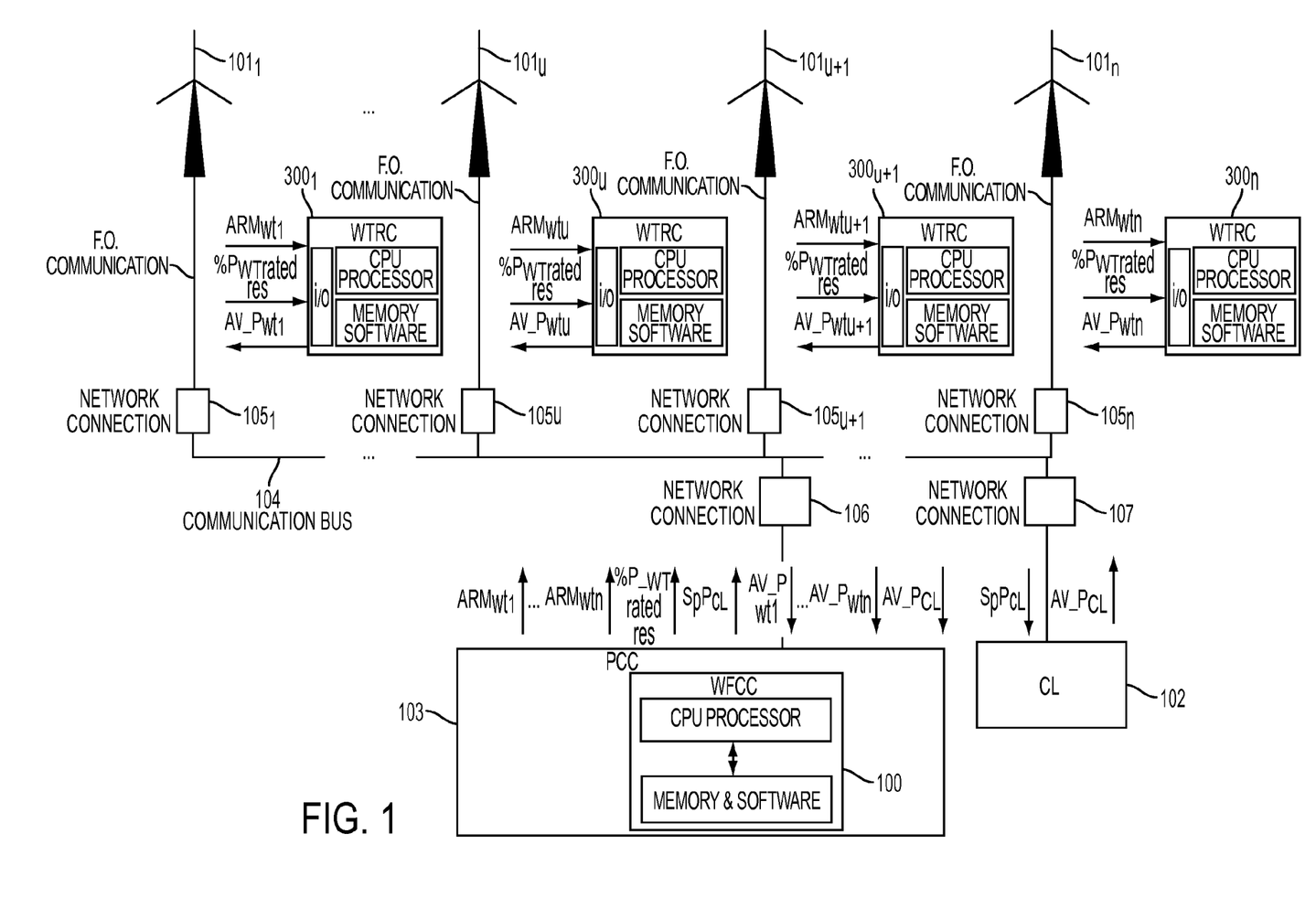
FIG. 1: Illustrates an exemplary embodiment of a wind farm that has an active power reserve control system topology and the hardware elements of the wind farm.

An exemplary topology of a wind farm with an active power reserve system is shown in FIG. 1. This system includes of a plurality of wind turbines ($101_1$ through $101_n$) and two subsystems: the wind farm central control (WFCC) (100), shown in detail in FIG. 2a and FIG. 2b, which can be located in the substation or point of common coupling (PCC) (103), and the wind turbine relative control (WTRC) ($300_1$ through $300_n$), shown in detail in FIG. 3, which is carried out in at least one of the wind-turbines in the wind farm (see $101_1$ through $101_n$ in FIG. 1). FIG. 1. also shows a controlled load (102) which in this exemplary embodiment is located in the substation of the wind farm. The controlled load may be used as either an electrical load or as electrical storage unit. An objective of this system is to follow a given setpoint of active power reserve for the wind-farm as a whole. Moreover, this reserve of active power can be managed by the WFCC (100).

Additionally, each WTRC ($300_1$) through ($300_n$) may be configured to communicate with the WFCC (100) using a communication bus (104) via network connections ($105_1$) through ($105_n$) and network connection (106) to communicate various variables including active reserve mode commands ARMwti, relative power commands % Pwt_rated_res, and active power measurements AV_Pwti. The WFCC (100) also may be configured to communicate with the controlled load (102) via the communication bus (104) and network connection (107).

Wind Farm Central Control (WFCC) system

The Wind Farm Central Control (WFCC) (100) is in charge of satisfying the desired active power reserve (% Sp_Pres) of the wind farm. In one embodiment % Sp_Pres is defined as a percentage of the active power of the wind farm at the present moment. In a different embodiment % Sp_Pres could be defined as the value of the desired reserve of active power related to the rated wind farm power, i.e., in absolute units (e.g. kW).

Figure 2A:
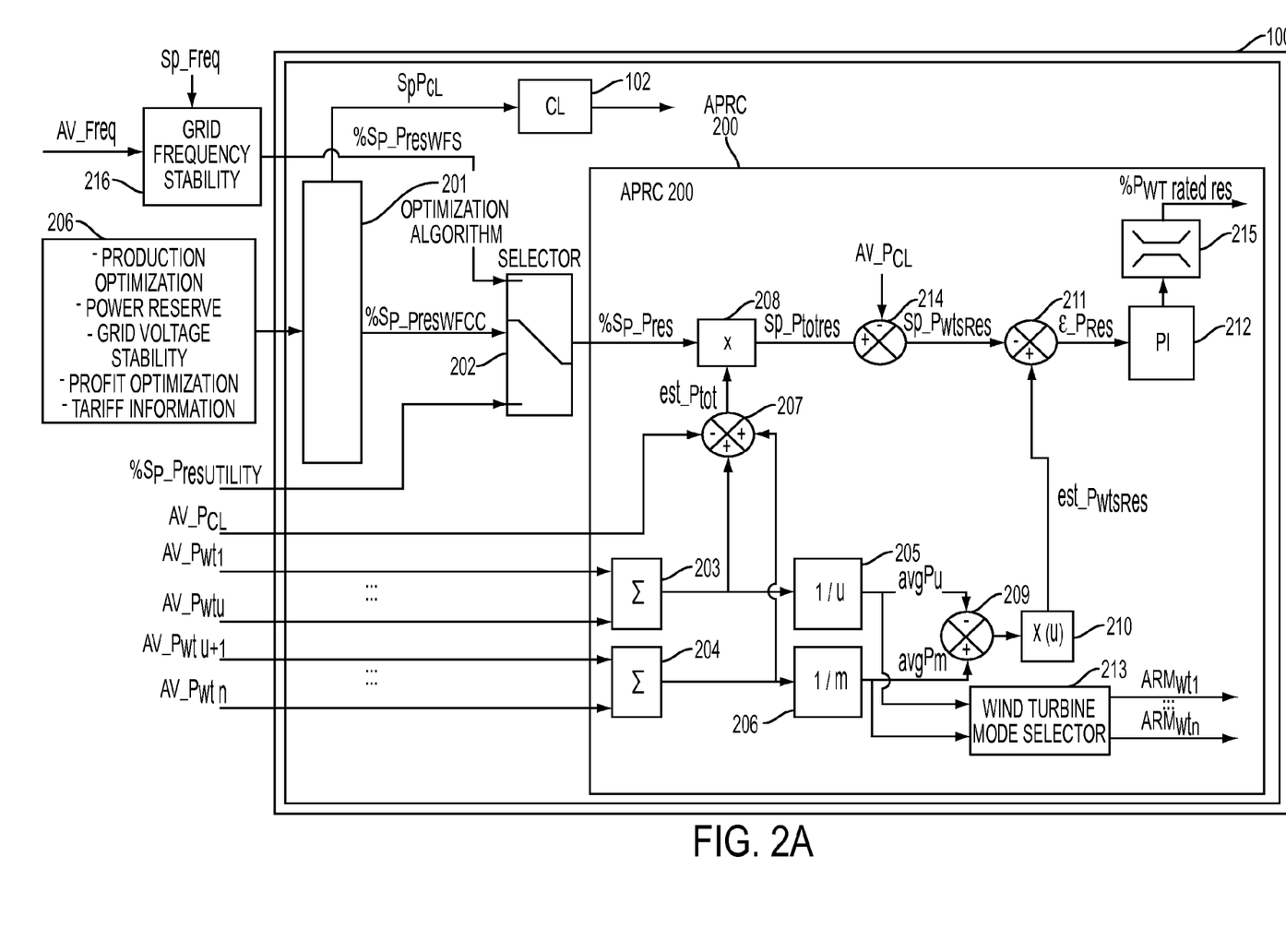
FIG. 2a: Illustrates an exemplary embodiment of a wind farm central control (WFCC) for the control of an active power reserve in a wind farm.

Referring to FIG. 2a, which illustrates a WFCC 100, the wind farm active power reserve setpoint (% Sp_Pres) can be received either from the electric utility or generated by the WFCC according to several criteria predefined in an optimization algorithm (201). For instance, power reserve scheduling, grid stability and economic profit optimization based on the control of the active power reserve are some of the criteria that may be taken into account in the optimization algorithm.

Figure 2B:
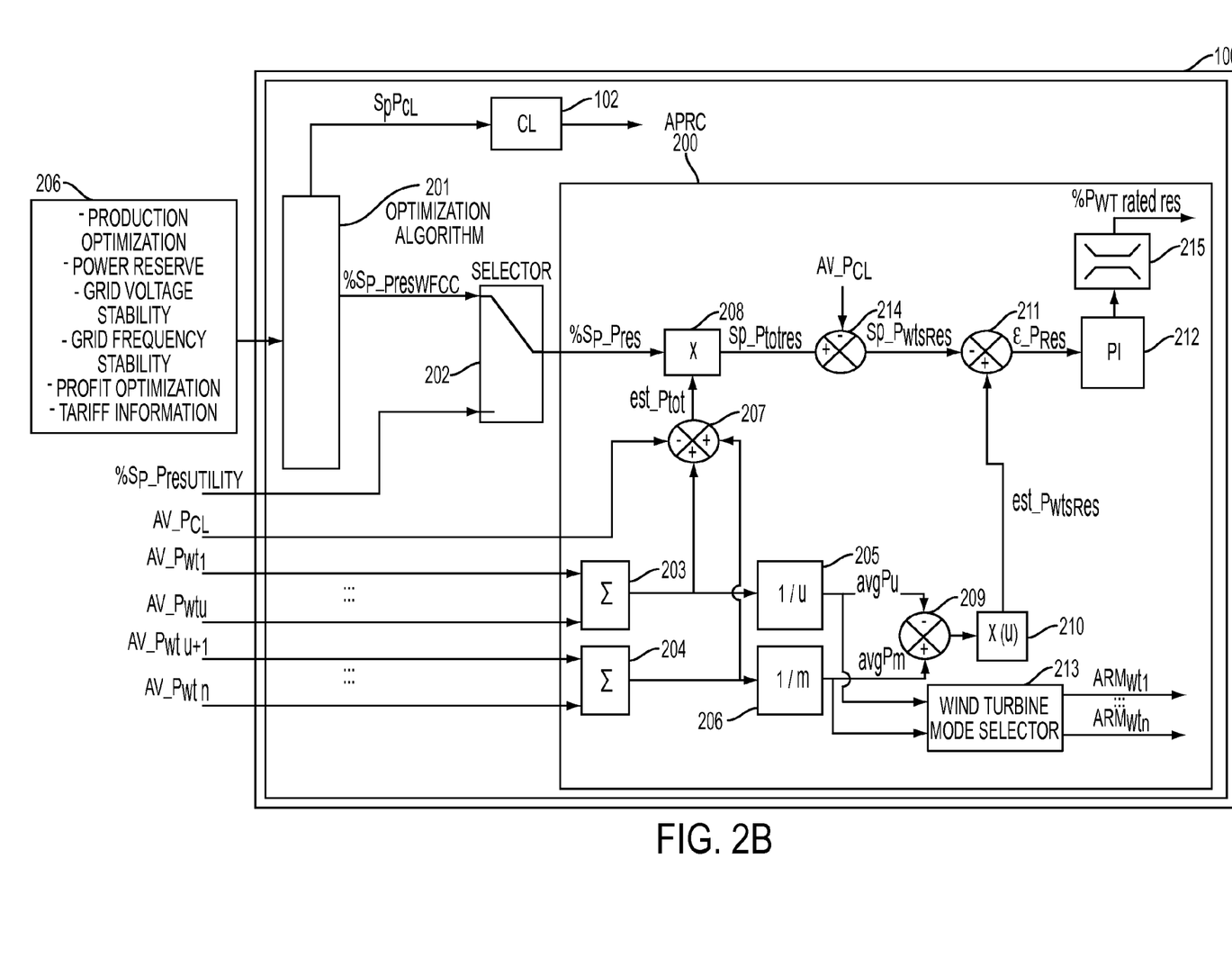
FIG. 2b: Illustrates an exemplary embodiment of a wind farm central control (WFCC) where the grid frequency stability is an input to the optimization algorithm.

In one embodiment, illustrated in FIG. 2a, for example, the WFCC (100) receives various information (206) used to determine the active power reserve setpoint (%). Such information (206) can include relevant tariff information from the utility, e.g. kWh tariff depending on the time, short term demand, a bonus because of an active power reserve, grid capacity, production optimization information, grid frequency deviations, production optimization, power reserve requirements, grid voltage stability, etc. In one embodiment such information (206) can also include the grid frequency stability (216) as described in FIG. 2a and as shown in FIG. 2b. The WFCC (100) includes an optimization algorithm (201) which can be based on economic profit optimization. Such an algorithm takes into account the aforementioned inputs as well as profit optimization parameters to generate an active power setpoint % Sp_PresWFCC, for example in order to maximize the economic profit of the wind farm, according to well known numerical optimization algorithms. This algorithm also generates the $S_pP_{CL}$ taking into account the aforementioned inputs and the actual power consumption of the controlled load, and the characteristics and constraints of the controlled load. Providing power to this controlled load takes advantage of the active power reserve instead of not using it. In other words, instead of limiting the wind turbine output to maintain an active power reserve, the active power reserve may be maintained by diverting the power constituting the reserve or a part of it to a controlled load. The amount of power diverted to the controlled load is then considered part of the active power reserve. The controlled load can be one or a plurality of different loads arranged in series or parallel or any other configuration.

Figure 4:
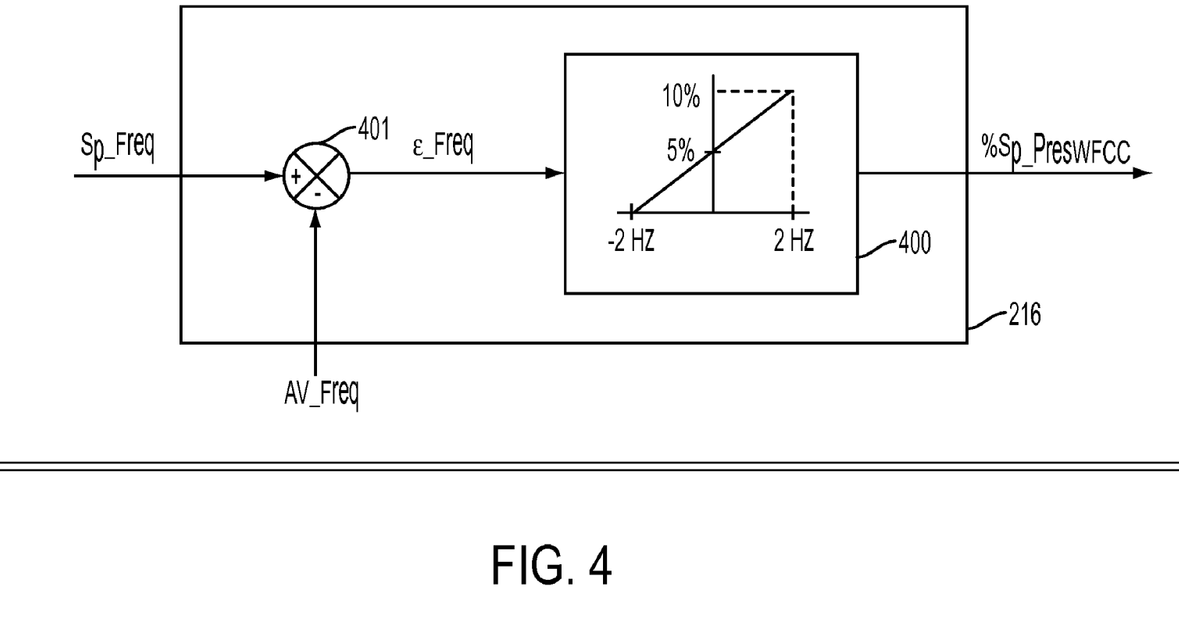
FIG. 4: Illustrates an exemplary embodiment wherein an optimization algorithm uses the active power reserve to support the grid frequency.

In another embodiment, in order to support the grid voltage stability, the % Sp_PresWFCC can be generated based on the measurement of the grid frequency (216) which is shown in detail in FIG. 4. A frequency error ($\epsilon$_Freq) is calculated in unit (401) by subtracting the actual value of the grid frequency (AV_Freq) from the desired frequency (Sp_Freq), for example 60 Hz. The frequency error is applied to a Look Up Table or a proportional/integral/derivative (PID) controller or a more complex structure (400) to obtain the % Sp_PresWFCC. For example, in one embodiment, if the frequency error is 1 Hz, the value of % Sp_PresWFCC is 7.5%.

Alternatively, an active power reserve setpoint % Sp_PresUtility can be directly sent by the electric utility. In this case selector (202) selects one of the % Sp_PresWFCC and the % Sp_PresUtility as the final power setpoint, % Sp_Pres, which is entered into an active power reserve controller (200), APRC. This selection depends on the constraints imposed by the utility or by the wind plants developers.

Control of Active Power Reserve

The following description is a non-limiting explanatory embodiment of the invention.

Referring to FIGS. 2a and 2b, the wind-farm central controller assigns to each wind-turbine one of the above mentioned operational modes (APOM, APRM), according to criteria which will be explained in detail below. Consequently, out of the total number of wind-turbines in the wind farm, designated as n, there will be u wind-turbines which will operate in APRM, and the rest, m, (wherein m=n−u) will operate in APOM. Commands for these settings will be sent to each wind-turbine from the WFCC through a communication network (104-107).

The active power reserve controller (APRC, (200)) receives as inputs the active power measurement of every wind-turbine in the wind farm, $AV\_P_{wt1}$ through $AV\_P_{wt\_n}$, the power of the controlled load $AV\_P_{CL}$, as well as the setpoint for the active power reserve, % Sp_Pres.

The APRC 200 calculates an estimation of the total wind-farm power delivered to the grid by using adder (207) according to the measured power by each wind-turbine in units (203) and (204) taking into account the actual power consumption of the controlled load $AV\_P_{CL}$. In other words, the active power generated by all the wind turbines operating in the APRM mode is summed in unit (203) and the active power generated by all the wind turbines operating in the APOM mode is summed in unit (204). In adder (207), these two values are added together and the $AV\_P_{CL}$ is subtracted from this result to get an estimation of the total wind farm power delivered to the grid (est_Ptot).

$$est\_Ptot=\Sigma(Av\_Pwt1\ldots Av\_Pwtu)+\Sigma(Av\_Pwt(u+1)\ldots Av\_Pwtn)-AV\_P_{CL} \quad \text{Eq. 1}$$

The setpoint of the active power reserve, % Sp_Pres, is converted to absolute units, Sp_PtotRes, by a multiplier unit (208) according to the following equation:

$$Sp\_PtotRes=\%\ Sp\_Pres\times estPtot, \quad \text{Eq. 2}$$

For instance, considering a wind farm which is producing 10 MW and it receives a command to reserve 10% of the actual power production, the production will be 9 MW and the reserve will be 1 MW in order to fulfil this requirement.

In other embodiments, Sp_PtotRes could be set directly in absolute units, for example, as a percentage of the rated wind-farm power. For instance, if a wind farm with a rated power of 20 MW, which is currently producing 10 MW, receives a command to reserve the 10% of the rated power, the production will be 8 MW and the reserve will be 2 MW in order to fulfill this requirement.

The active power reserve Sp_PtotRes can be achieved both by the controlled load and by the wind turbines operating in APRM. In order to determine the share of the active power reserve which is accomplished by the wind turbines, i.e. Sp_PwtsRes, the power consumption of the controlled load $AV\_P_{CL}$ is subtracted from the setpoint of the active power reserve which has been converted to absolute units Sp_PtotRes, by adder (214) to output Sp_PwtsRes.

In one embodiment, the APRC controller 200 calculates the mean value of the active power of the wind-turbines operating in APRM (avgPu) in unit (205) and the APRC separately calculates the corresponding mean value of the active power for wind-turbines in APOM (avgPm). In other embodiments, avgPm and avgPu can be calculated with a more complex mathematical function, such as a weighted average.

The average active power generated by the wind turbines operating in the APRM mode (avgPu) is calculated in unit (205) by dividing the total active power generated by all the turbines operating in the APRM (203) by the total number of wind turbines operating in the APRM mode u. Similarly, the average active power generated by the wind turbines operating in the APOM mode (avgPm) is calculated in unit (206) by dividing the total active power generated by all the turbines operating in the APOM (204) by the total number of wind turbines operating in the APOM mode m.

The absolute active power reserve setpoint, Sp_PwtsRes, is regulated by a PID controller (212) or a higher order transfer function, such as a lead-lag controller as well as standard non linear blocks, e.g. saturation blocks or rate limiters, by using est_PwtsRes, which is an estimation of the total active power reserve in the wind-farm and is obtained by the following equation in which the difference between the average active power of wind turbines operating in APRM is subtracted from the average active power of the wind turbines operating in APOM by subtractor (209) and then multiplied in multiplier (210) by the number of wind turbines operating in APRM mode:

$$est\_PwtsRes=(avgPm-avgPu)\times u \quad \text{Eq. 3}$$

Figure 3:
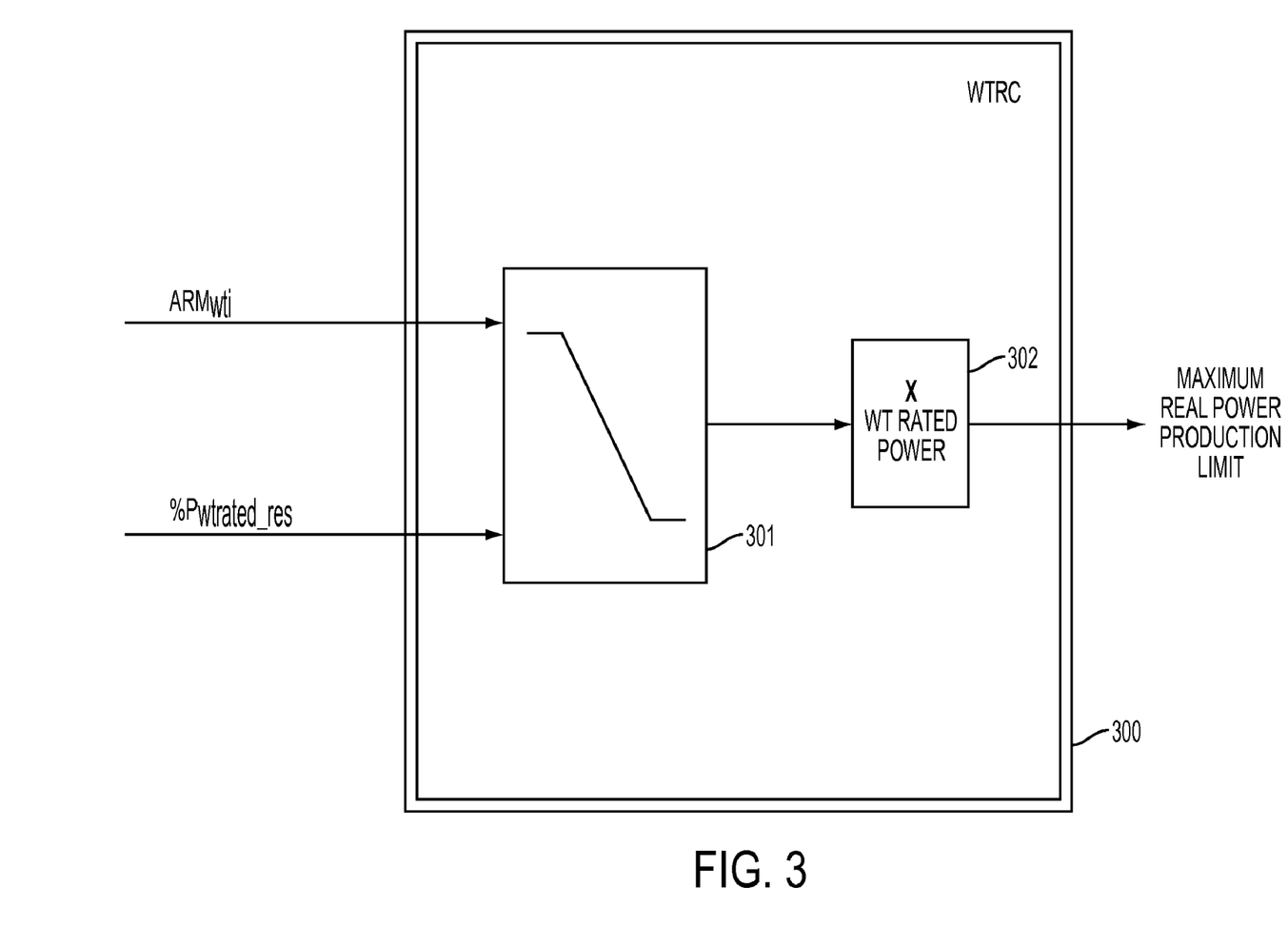
FIG. 3: Illustrates an exemplary embodiment of a wind turbine relative control (WTRC).

The absolute reserve setpoint, Sp_PwtsRes is subtracted, by using subtractor (211), from est_PwtsRes (211), to produce an error value ϵ_Pres. This error is input into PID controller (212). The output of the PID controller (212) in the APRC, % Pwt_rated_res, will be the percentage of the rated power output which is not allowed to be exceeded by the wind-turbines operating in APRM. % Pwt_rated_res is limited between a maximum and minimum value by block (215). In one embodiment, these values are dependent on the particular wind turbine technology. The % Pwt_rated_res command will be enforced by the WTRC (300) in each turbine working in APRM, as it is described later.

% Pwt_rated_res is distributed as a unique command to all the wind turbines. The wind turbines that have been selected for APRM will reduce their maximum power output in accordance to their rated power and the commanded percentage, % Pwt_rated_res. On the other hand, wind turbines selected for APOM will ignore the command and continue without any restriction in their power output.

Moreover, the APRC will determine the operating mode of each wind-turbine: either APRM or APOM. This task involves determining the number of wind-turbines in APRM (i.e., u), APOM (i.e., m) as well as how the various modes APRM and APOM are distributed within the wind farm. In one embodiment, m is determined based on the active power reserve setpoint.

In order to achieve a balanced share of the control effort associated with the implementation of active power reserve, the APRC will continuously update m (and therefore, u, which equals n−m, as previously explained) so that (avgPu/avgPm)*100 is maintained between an upper and lower threshold. This function is carried out by the wind-turbine mode selector unit (213) as shown in FIG. 2a.

Figure 5:
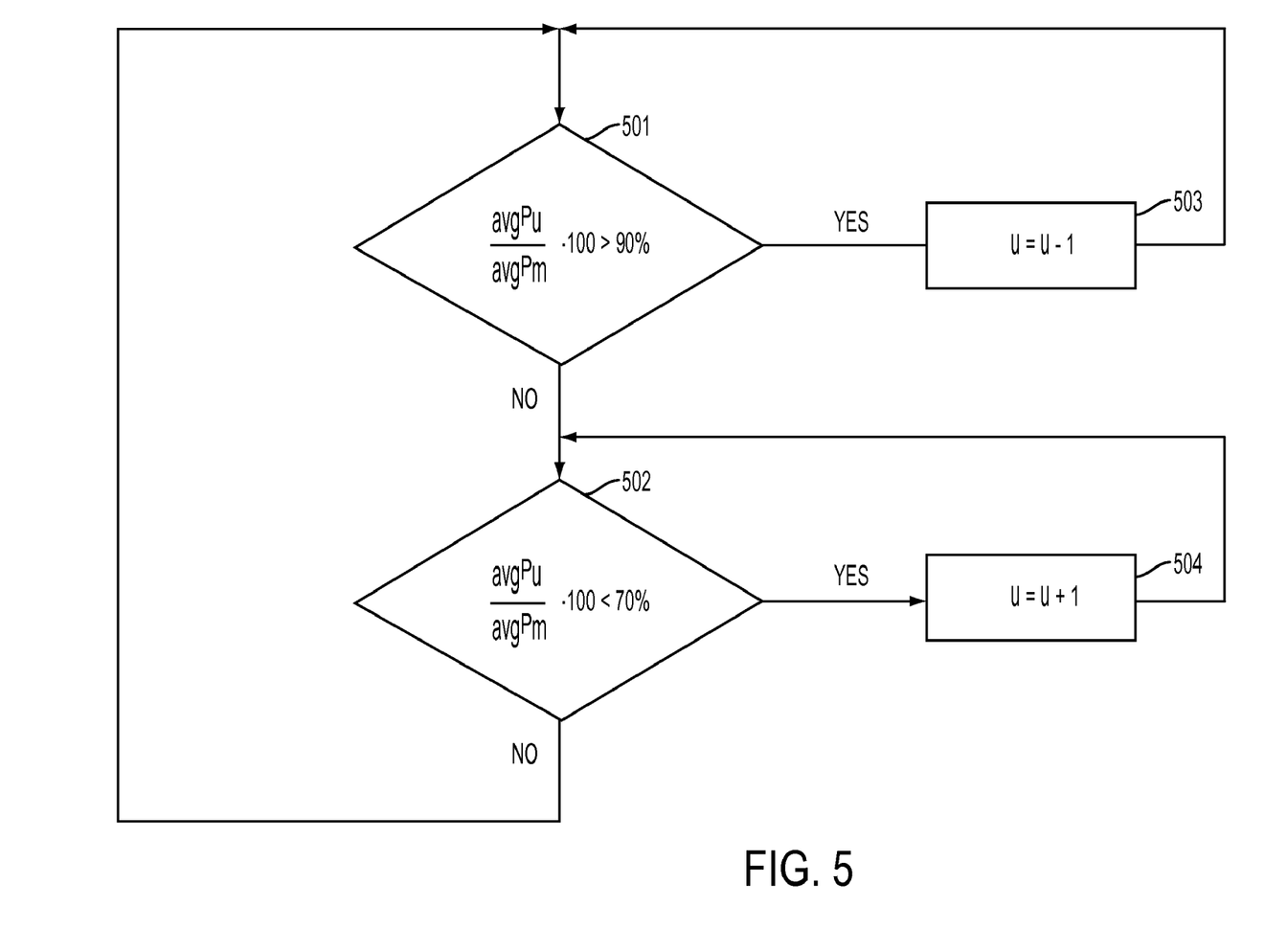
FIG. 5: Is a flowchart that illustrates method for showing the determination of the number of wind turbines in APRM and APOM states.

For instance, with reference to FIG. 5, if (avgPu/avgPm)*100 decreases below 70% (502), then u will be increased (504) so that the control effort is shared between more wind-turbines and therefore (avgPu/avgPm)*100 will rise above 70%. Quite the opposite, if (avgPu/avgPm)*100 rises above 90% (501), then u will decrease (503) in such a way that the number of limited wind-turbines will be reduced and (avgPu/avgPm) will decrease below 90%. This is necessary in order to have an accurate enough estimation of the available active power reserve. In other embodiments, hysteresis in the thresholds will be used to prevent excessive updating of u.

One of the goals of the above described mode selector (213) is to prevent the wind-turbines in APRM from operating too far from the rated design conditions (e.g., wind-turbine operating at 10% of power output in high windspeeds). An additional goal is to ensure a reliable estimation of the power reserve.

The operating mode is set using active reserve mode commands ARMwti [ARMwt1 . . . ARMwtn], issued from APRC (200) as an output of the Wind Turbine Mode Selector (213) to each of the wind turbines through the communication network (104).

Figure 6:
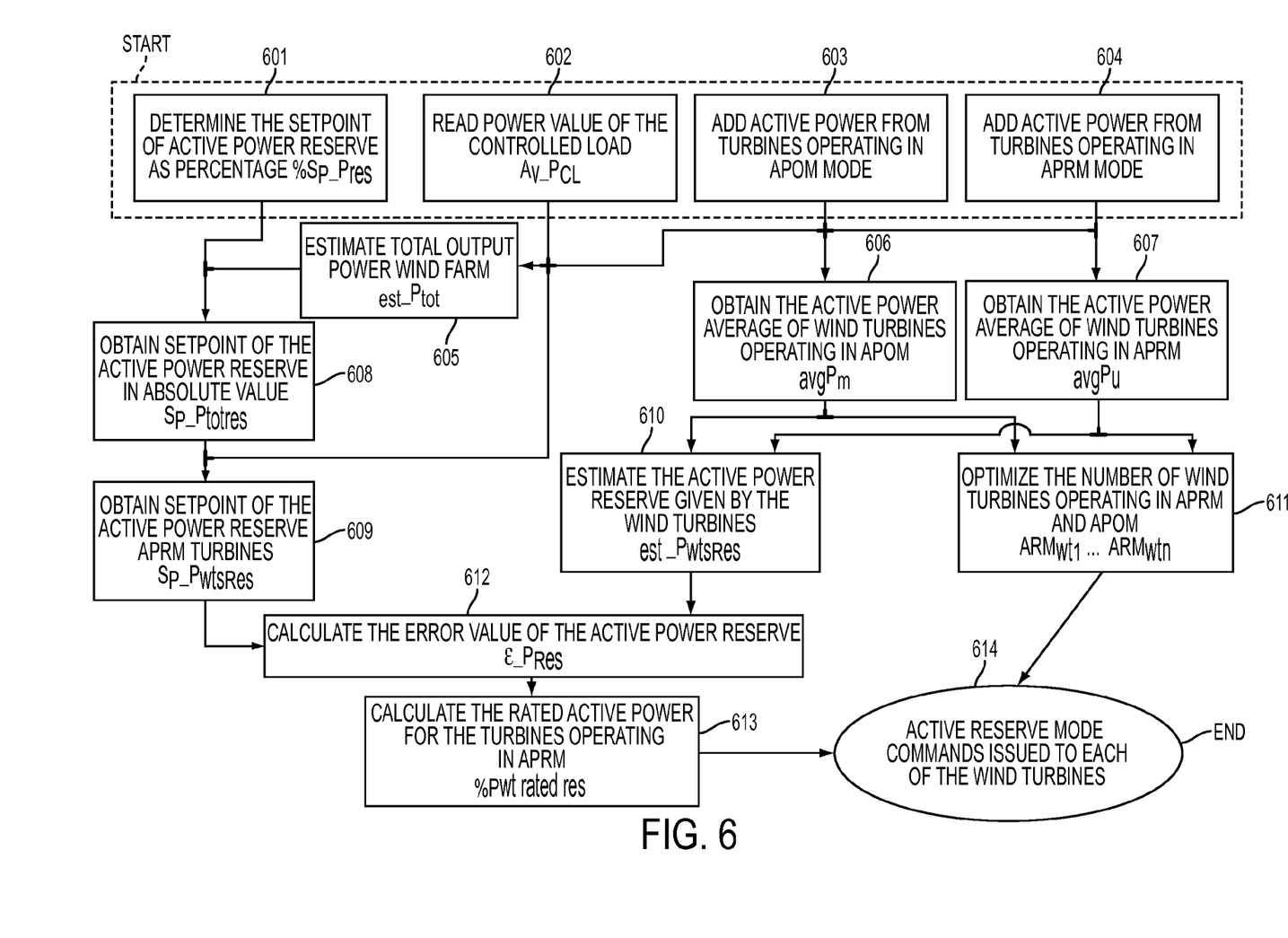
FIG. 6: Is a flowchart that illustrates methods of operating wind turbines in a wind farm.

A method for managing the active power reserve in a wind farm is shown in FIG. 6. Initially, the setpoint of the active power reserve % Sp_Pres is determined in operation (601). Additionally, the actual power value of the controlled load $AV\_P_{CL}$ is determined in operation (602). The active power from the turbines operating in APOM and APRM are summed in operations (603) and (604), respectively. An estimate of the total output power est_Ptot of the wind farm is determined in operation (605) by summing the active power of the turbines operating in APOM and APRM, and subtracting the actual power value of the controlled load $AV\_P_{CL}$. An absolute value setpoint of the active power reserve Sp_PtotRes is determined in operation (608) by multiplying est_Ptot by the active power reserve setpoint % Sp_Pres. The actual power value of the controlled load $AV\_P_{CL}$ is subtracted from this setpoint Sp_PtotRes to determine the setpoint of the active power reserve of the APRM turbines Sp_PwtsRes in operation (609).

This setpoint Sp_PwtsRes is compared to the estimate of active power reserve currently provided by the wind turbines est_PwtsRes to calculate an error value of the active power reserve $\epsilon$_Pres in operation (612). The estimate of active power reserve currently provided by the wind turbines est_PwtsRes is determined in operation (610) based on the average active power of the wind turbines avg Pm operating in APOM determined in operation (606) and the average active power of the wind turbines avg Pu operating in APRM determined in operation (607). The rated active power for the turbines operating in APRM, % Pwt rated res, is determined in operation (613) based on the error value $\epsilon$_Pres.

The number of wind turbines operating in APRM and APOM (ARMwt1 . . . ARMwtn) is optimized in operation (611) based on the average active power of wind turbines operating (avgPm) in APOM determined in operation (606) and the average active power of wind turbines operating (avgPu) operating in APRM as determined in operation (607).

The active reserve mode commands used to control each of the wind turbines in the wind farm are issued in operation (614) based on the rated active power of the turbines operating in APRM and the optimization result of operation (611).

Wind Turbine Relative Control (WTRC) System

The WTRC system is in charge of receiving and implementing commands from the central controller, in order to ensure that the wind turbine contributes to the active power reserve.

The WTRC (300) system, as illustrated in FIG. 3, receives from the WFCC (100) both the relative power command, % Pwt_rated_res, and the active reserve mode commands ARMwti from the WFCC.

% Pwt_rated_res is expressed in relative terms as a percentage of each turbine's rated power output.

The WRTC (300) includes a selector (301) and a multiplier connected to an output of the selector (301). Depending on the ARMwti command, the selector 301 switches between 100% and % Pwt_rated_res. The multiplier 302 multiplies the output of the selector (100% or % Pwt_rated_res) by the wind turbine's rated power resulting in the maximum real power production limit. In other words, depending on whether the wind turbine is in APOM or APRM, % Pwt_rated_res will be ignored (APOM) or enforced (APRM) at a particular wind turbine. In the latter case, the wind-turbine power output is controlled to not allow the power output to exceed % Pwt_rated_res of the rated power output of the wind-turbine. If the ARMwti command indicates that % Pwt_rated_res is to be ignored, the maximum power output of the wind-turbine will be controlled to be 100% of the rated power.

The present invention is described hereinafter with reference to control illustrations of user interfaces, methods, and computer program products according to embodiments of the invention. It will be understood that each block, and combinations of blocks in the illustrations, can be implemented at least in part by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create apparatuses for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks. The computer program instructions may also be loaded into a computer or other programmable data processing apparatus to cause a series of operational steps to be performed in the computer or other programmable apparatus to produce a computer implemented process such that the instructions that execute in the computer or other programmable apparatus provide steps for implementing the functions specified in the flowchart block or blocks.

In conclusion, the active power system described here is able to manage an active power reserve in order to cope with eventual grid contingencies. Proper control of an active power reserve has been described in an integrated manner taking into account the network priorities such as grid voltage stability, power reserve or frequency deviations at each moment as well as the effort demanded by the wind turbines. The available wind energy is accurately estimated by operating a subset of wind turbines as an observer, avoiding the uncertainty associated with other methods based on direct measurement of wind speed. Furthermore, the optional use of a controlled load has been described, such as an electric load or an energy storage, in order to take advantage of the active power reserve in the wind farm.

What is claimed is:

1. A system of active power reserve regulation in a wind farm having a plurality of wind turbines, comprising:
   a first subset of the plurality of wind turbines operating at a maximum available power output;
   a second subset of the plurality of wind turbines operating in accord with active power limitation commands;

a wind-farm controller which interacts with the plurality of wind turbines to manage a reserve of active power using the active power limitation commands and which estimates a maximum amount of available active power generated by the plurality of wind turbines based on the first subset of the plurality of wind turbines;

an active power wind-turbine controller in each of the plurality of wind-turbines, wherein each active power wind turbine controller is configured to limit a maximum amount of available active power generated by a corresponding one of the plurality of wind turbines according to the active power limitation commands received from the wind-farm controller for managing the reserve of active power.

2. The system of claim 1, further comprising a controlled load which receives active power from the wind-turbines, said active power being part of the active power reserve.

3. The system of claim 2, wherein the controlled load is used as an electric load or as electrical energy storage.

4. The system of claim 2, wherein the controlled load is an electrolyzer, a flywheel, or other type of energy storage device.

5. The system of claim 1, wherein the active power reserve wind-farm controller transmits an active reserve mode command to the plurality of wind-turbines so that the first subset of wind turbines operate with no external power output limitations and the second subset of wind-turbines operate at less than a maximum active power output, according to the active power limitation command received from the wind farm controller, to contribute to the total reserve of active power in the wind-farm.

6. The system of claim 2, wherein the active power reserve wind-farm controller determines an actual power consumption of the controlled load and determines an active power limitation command for the second subset of wind turbines based on the actual power consumption of the controlled load and the active power reserve setpoint.

7. The system of claim 5, wherein the first subset of wind-turbines, in response to the active power reserve mode command, operate with no constraints related to the wind farm active power reserve controller, and maintain said maximum active power output unless additional constraints unrelated to the reserve of active power limit the active power output.

8. The system of claim 5, wherein the second subset of wind-turbines, in response to the active power limitation command, do not exceed a commanded percentage of their rated active power.

9. The system of claim 5, wherein a number of wind-turbines in the second subset of wind turbines is varied based on a difference between an actual value of the total reserve of active power in the wind farm and a target value of the total reserve of active power in the wind farm.

10. The system of claim 9, wherein the second subset of wind turbines is varied based on the active power reserve setpoint.

11. The system of claim 9, wherein the second subset of wind turbines is varied based on a ratio between a mean active power output from the first subset of wind turbines and a mean active power output from the second subset of wind turbines.

12. The system of claim 11, wherein the ratio is maintained between an upper threshold and a lower threshold.

13. The system of claim 1, where the first and second subsets comprise different wind-turbines among the plurality of wind turbines.

* * * * *